United States Patent
Dupey et al.

(10) Patent No.: US 10,234,295 B2
(45) Date of Patent: Mar. 19, 2019

(54) ADDRESS REMEDIATION USING GEO-COORDINATES

(71) Applicant: SAP SE, Walldorf (DE)

(72) Inventors: Ronald Dupey, West Salem, WI (US); Jeffrey Woody, Onalaska, WI (US); Prasanthi Thatavarthy, Onalaska, WI (US)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 14/934,828

(22) Filed: Nov. 6, 2015

(65) Prior Publication Data

US 2017/0131106 A1 May 11, 2017

(51) Int. Cl.
| | |
|---|---|
| *B60W 40/08* | (2012.01) |
| *B60W 50/10* | (2012.01) |
| *G01C 21/36* | (2006.01) |
| *G01C 21/32* | (2006.01) |

(52) U.S. Cl.
CPC .................................. *G01C 21/32* (2013.01)

(58) Field of Classification Search
None
See application file for complete search history.

(56) References Cited

U.S. PATENT DOCUMENTS

| | | | |
|---|---|---|---|
| 2005/0171691 A1* | 8/2005 | Smartt | G01C 21/3605 701/426 |
| 2010/0179754 A1* | 7/2010 | Faenger | G06F 17/3087 701/532 |
| 2011/0004399 A1* | 1/2011 | Smartt | G01C 21/3605 701/532 |
| 2013/0013202 A1* | 1/2013 | Som | G09B 29/106 701/532 |
| 2014/0280160 A1* | 9/2014 | Scriffignano | G06F 17/30241 707/737 |
| 2014/0351277 A1* | 11/2014 | Rinne | G06F 17/30041 707/756 |

* cited by examiner

*Primary Examiner* — Thomas G Black
*Assistant Examiner* — Demetra R Smith-Stewart
(74) *Attorney, Agent, or Firm* — Buckley, Maschoff & Talwalkar LLC

(57) ABSTRACT

A system includes reception of first address data associated with a first location, the first address data comprising first geo-coordinates, determination of a first two or more candidate cities based on the first address data, identification of a first one of the first two or more candidate cities based on the first geo-coordinates, and generation of second address data associated with the first location based on the identified first one of the first two or more candidate cities.

12 Claims, 8 Drawing Sheets

| Address | City Region Postcode | Geo-Coordinates |
|---|---|---|
| 1160 Riverview Street | Madison | 38.7451958, -85.3946044 |
| 340 Springe | Tampa Florida 33624 | 28.090487, -82.513430 |
| Target, East Higgins Rd | Schaumburg IL | 42.0376005, -88.048884 |

FIG. 2

ADDRESS REMEDIATION USING GEO-COORDINATES

BACKGROUND

Enterprise database systems store vast amounts of data received from one or more different sources. This data is typically stored in records of relational database tables. The records may be subjected to various types of processing in order to standardize, verify and/or complete the data contained therein.

Typically, address data is processed by matching the address data to reference data and then correcting errors in the address data based on matched reference data. In some examples, matching address data to reference data involves multiple chained lookups. For instance, the country of the address data is identified, and then the consistency of the city, region and postal code is verified. The latter verification may include, for example, determining whether the values Chicago, Ill. and 60612 correlate with one another. After this verification, it is determined whether the specified street is located in the city, and whether the specified house number is valid on the specified street.

The record is flagged for post-processing if any of the above determinations fail. Post-processing typically consists of manual review and correction of flagged records. In some scenarios, the number of flagged records is in the thousands and the resulting post-processing is therefore extremely time- and labor-intensive.

BRIEF DESCRIPTION OF THE DRAWINGS

FIG. 2 is a tabular representation of a database table.

DETAILED DESCRIPTION

The following description is provided to enable any person in the art to make and use the described embodiments. Various modifications, however, will remain readily apparent to those in the art.

Figure 1:
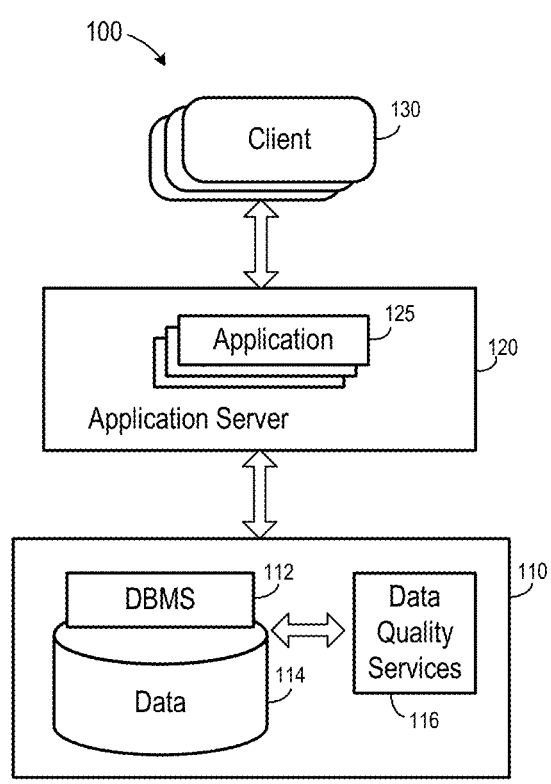
FIG. 1 is a block diagram of a database architecture according to some embodiments.

FIG. 1 is a block diagram of database architecture 100 according to some embodiments. Embodiments are not limited to architecture 100 or to a database architecture. Architecture 100 includes database 110, application server 120 and clients 130.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130 via such user interfaces, retrieving data from database 110 based on the requests, processing the data received from database 110, and providing the processed data to clients 130. Applications 125 executing within application server 120 may also expose administrative functions to clients 130, including but not limited to data quality services as will be described below. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112, data 114 and data quality services 116. One or more applications 125 executing on server 120 may communicate with DBMS 112 using database management interfaces such as, but not limited to, Open Database Connectivity (ODBC) and Java Database Connectivity (JDBC) interfaces. These types of applications 125 may use Structured Query Language (SQL) to manage, modify and query data stored in database 110.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Data 114 may be indexed and/or selectively replicated in an index to allow fast searching and retrieval thereof. Database 110 may support multi-tenancy to separately support multiple unrelated clients by providing multiple logical database systems which are programmatically isolated from one another.

Data 114 may also store metadata regarding the structure, relationships and meaning of the data stored within data 114. This information may include data defining the schema of database tables stored within data 114. A database table schema may specify the name of the database table, columns of the database table, the data type associated with each column, and other information associated with the database table.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data quality services 116 may comprise functions to selectively process data of data 114. These functions may include, but are not limited to, data cleansing, data matching, best record identification, semantic profiling and data enrichment functions. These functions may be exposed to applications 125 via the OData protocol, and thereby available to clients 130 for direct initiation or as underlying processes of an algorithm executed by an application 125.

Data 114 may therefore include "raw" data and processed data. For example, data 114 may include address records including data received from one or more sources, and "cleansed" address records which are output from a cleansing operation. A cleansing operation may include one or more chained transforms. Generally, a transform generates a set of output records from a set of input records. The input records and the output records may or may not exhibit different schemas.

Application server 120 may be separated from or closely integrated with database 110. A closely-integrated application server 120 may enable execution of server applications 125 completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

FIG. 2 is a tabular representation of a portion of address table 20 for purposes of example. The illustrated portion of table 20 includes three columns (i.e., Address, City Region Postcode, and Geo-coordinates) and three records 20a through 20c. The records of address table may be stored in data 114 in any suitable format. The data of each record may have been received from one or more data sources. Embodiments are not limited to the schema or to the number of records shown in FIG. 2.

Figure 3:
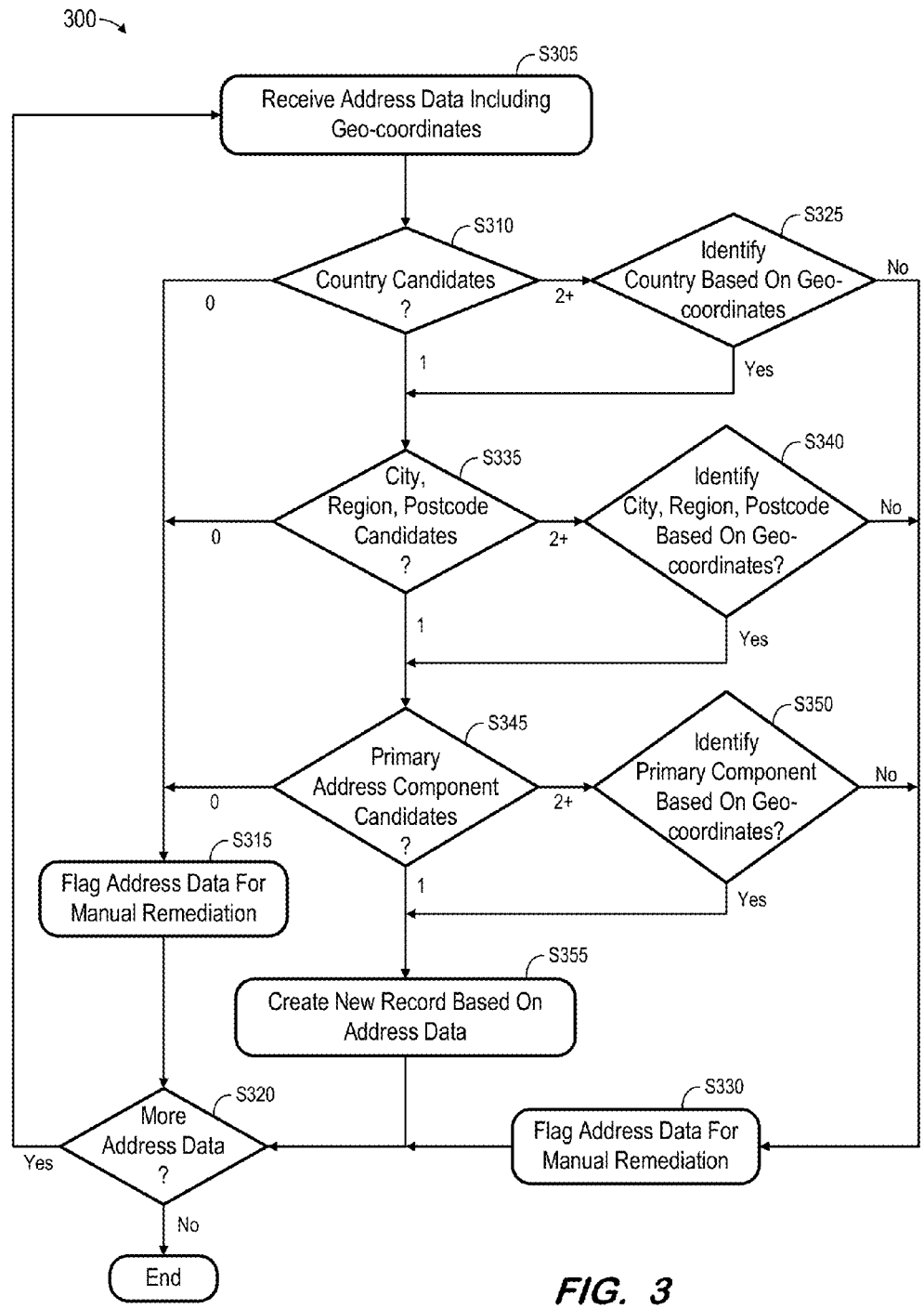
FIG. 3 comprises a flow diagram of a process according to some embodiments.

FIG. 3 comprises a flow diagram of process 300 according to some embodiments. Process 300 may comprise an address data transform according to some embodiments. In some embodiments, various hardware elements of architecture 100 (e.g., one or more processors) execute program code to perform process 300. The program code may be implemented within data quality services 116 according to some embodiments.

Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, address data is received at S305. The address data includes associated geo-coordinates of any geo-coordinate system (e.g., a latitude and a longitude). The received address data may comprise a record conforming to a schema of a database table. The address data may be received from any source and may represent a mailing address. The address data may be one member of a group of address data (e.g., a set of database table records) respectively representing many mailing addresses.

Process 300 may be executed in response to a command received from a user. For example, a client device 130 may access a data preparation application 125 and may present user interfaces thereof. A user may manipulate the user interfaces in order to select a set of records (e.g., all records) of an address table of data 114, and one or more transforms to apply to the set of records. Non-exhaustive examples of transforms include data validation and data standardization. In some embodiments, a table of data 114 stores address data and other data, and only the columns including address data are selected for processing according to process 300.

In the foregoing description, it will be assumed that the six records and three columns of FIG. 2 have been selected for processing. Accordingly, at S305, values of record 20a of table 20 are acquired. Next, at S310, zero or more countries are identified based on the address data.

For example, reference data is searched to determine whether any countries include one or more of the city, region and postcode values of the address data. The countries determined at S310 are referred to herein as candidates. A candidate country may, for example, be any country which includes all three of the city, region and postcode values of the address data, two or more of the values, the city value or the region value, and/or satisfies any other suitable criteria that is or becomes known.

If no candidate countries are determined, the address data is flagged for manual remediation at S315. Flagging for manual remediation may comprise setting a flag which is associated with the table record from which the address data was received and/or storing the address data in another database table, but is not limited thereto. Next, at S320, it is determined whether more address data remains to be processed. For example, it may be determined whether or not an entire set of designated address records has been processed according to process 300. If not, flow returns to S305 to receive additional address data.

Flow proceeds from S310 to S325 if two or more candidate countries are determined at S310. One of the two or more candidate countries is identified at S325 based on the geo-coordinates included with the address data. The identification at S325 may include determining a country which includes a location corresponding to the geo-coordinates and confirming that this country is one of the two or more candidate countries. If the country which includes the location corresponding to the geo-coordinates is not one of the two or more candidate countries, flow continues to S330 to flag the address data for remediation.

After S325, or after a determination of a single country candidate at S310, zero or more city, region and postcode candidates are determined at S335. For purposes of the example of record 20a, it will be assumed that the United States is identified as a sole candidate country at S310. Therefore, at S335, the city Madison (i.e., record 20a does not include region or postcode values) is validated against the country United States. In this case, it is determined that the city Madison exists in ten different regions (i.e., States).

Flow therefore proceeds to S340 to identify a city, region and postcode from the candidates based on the geo-coordinates. The identification at S340 may include determining which one of the city, region and postcode candidates includes a location corresponding to the geo-coordinates. With respect to 20a, it is determined at S340 that the candidate Madison, Ind. 47250 includes the location corresponding to the received geo-coordinates. Flow therefore continues to S345. If no candidate included the location, flow would proceed to S330 and continue as described above.

Next, it is determined at S345 whether there is an "1160 Riverview Street" in Madison, Ind. Since there is only one such street number/street combination, a new "cleansed" record is created at S355 based on the address data received at S305 and the subsequent processing. The new record may conform to a different schema and further processing may be applied to the address data in order to standardize punctuation, capitalization, abbreviations, etc.

Figure 4A:
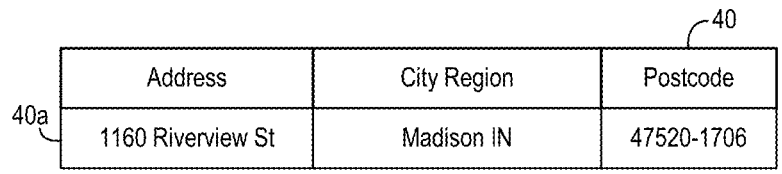
FIGS. 4A through 4C are tabular representations of cleansed data according to some embodiments.

FIG. 4A illustrates a tabular representation of a portion of cleansed address table 40. Record 40a has been generated at S355 according to the above example. As shown, the schema of table 40 differs from the schema of table 20, but embodiments are not limited thereto. The data "Street" has been standardized to "St" and the "+4" digits have been added to the original postcode.

Returning to process 300, flow continues to S320 and returns to S305 to receive new address data. It will now be assumed that the address data values of record 20b ("340 Springe", "Tampa Fla. 33624" and "28.090487, −82.513430" are received at S305. The sole country candidate United States is identified at S310. Next, at S335, it is validated that Tampa is a city in Florida and that 33624 is a valid postcode for Tampa.

At S345, it is discovered that there is no street in Tampa named "Springe". However, several streets with similar spellings are identified (e.g., Springs Drive, Springton Avenue, Springfield Court, Springview Lane). Due to the number of candidates, flow proceeds to S350 to identify primary address components from the candidates based on the geo-coordinates.

Figure 4B:
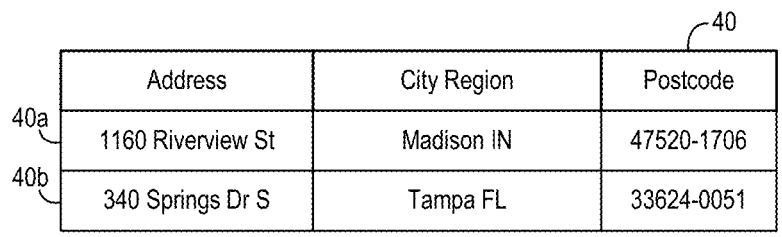

At S350, and in view of the street number "340", it may be determined whether the location associated with the geo-coordinates is proximate to the 300 block of any of the candidate streets. In the present example, the location lies within the 300 block of Springs Drive South and this street is therefore identified, along with the thusly-validated street number 340, at S350. A new record is created based on the validated data at S355, perhaps after undergoing further cleansing. FIG. 4B depicts such a record 40b according to some embodiments.

It will be assumed that flow again continues to S320 and returns to S305 to receive the address data values of record 20c ("Target, East Higgins Rd", "Schaumburg Ill." and "42.0376005, −88.048884". The sole country candidate United States is identified at S310 and, at S335, it is validated that Schaumburg is a city in Illinois.

Figure 4C:
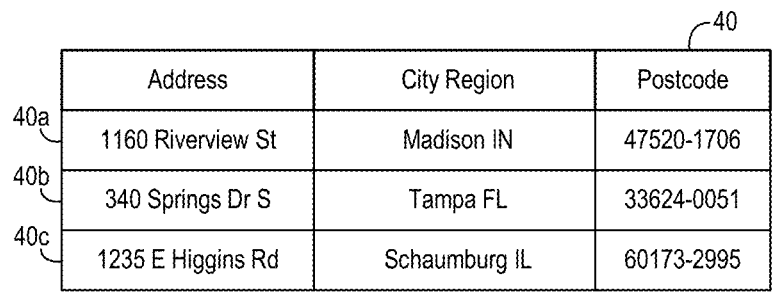

At S345, it is determined that East Higgins Road is a street in Schaumberg but that may candidate street numbers exist for this street. Accordingly, at S350, the geo-coordinates associated with "Target" on East Higgins Road in Schaumberg are retrieved from reference data and are validated against the received geo-coordinates. These coordinates match, so the street number of the Target is determined to be the validated street number at S350. A new record is created based on the validated data at S355, as shown in record 40c of FIG. 4C.

In some scenarios, the received geo-coordinates are too close to two or more candidates to automatically select one of the determined candidates. Geo-coordinates may be used in such scenarios to resolve the ambiguity.

Figure 5:
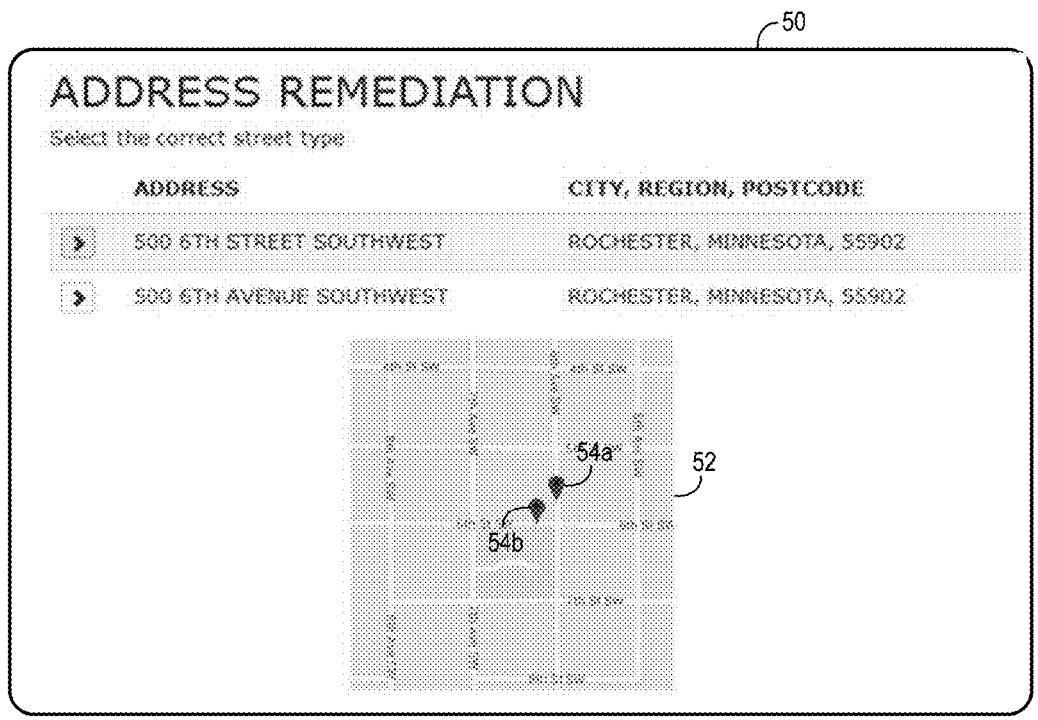
FIG. 5 is an outward view of a user interface according to some embodiments.

FIG. 5 is an outward view of user interface 50 listing two candidate street addresses "500 $6^{th}$ Street Southwest" and "500 $6^{th}$ Avenue Southwest". User interface 50 also displays map 52 including pins 54a and 54b marking the respective addresses. According to some embodiments, a user may identify the correct candidate at S350 by selecting one of pins 54a and 54b.

User interface 50 may be presented on any type of display apparatus (e.g., desktop monitor, smartphone display, tablet display) provided by any type of client device 130 (e.g., desktop system, smartphone, tablet computer). For example, a client device 130 may access a data preparation application 125 of application server 120 and may present user interface 50 during an address remediation process provided by data preparation application 125.

Figure 6:
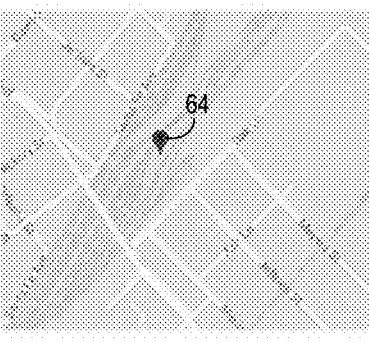
FIG. 6 is an outward view of a user interface according to some embodiments.

The set of candidates at S350 may exhibit a gap in street numbers, with the received geo-coordinates being located within the gap. For example, FIG. 6 shows user interface 60 listing six candidates, where the received house number "750" is not included in any of the address ranges of the candidates. User interface 60 also presents map 62 with pin 64 indicating the location associated with the geo-coordinates. The location may assist the user in identifying the correct one of the candidates. In some embodiments, pin is displayed at a location interpolated between the ends of the gap in candidate street numbers.

Figure 7:
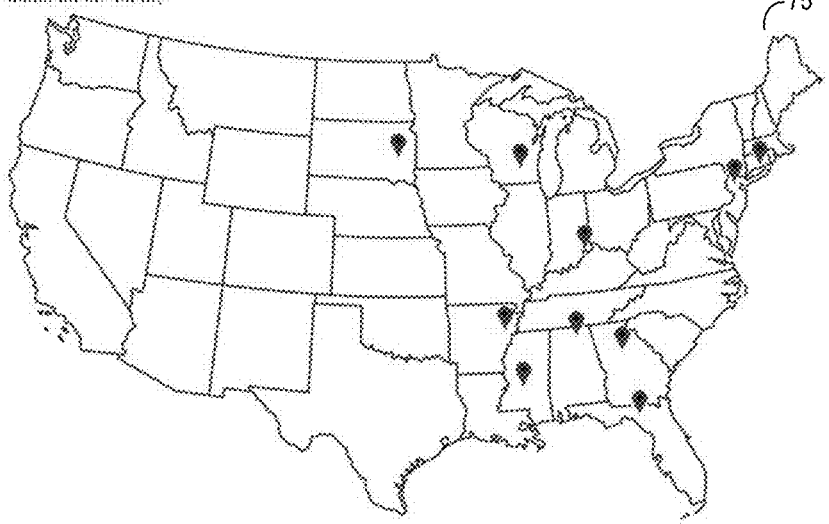
FIG. 7 is an outward view of a user interface according to some embodiments.

An example is now considered in which the received address data values are "1160 Riverview Street" and "Madison". It will be assumed that ten cities named Madison include this street address. FIG. 7 shows user interface 70 listing the ten candidates addresses and map 75 showing pins at each of the associated locations. Again, a user may identify the correct candidate at by selecting one of the displayed pins.

Figure 8:
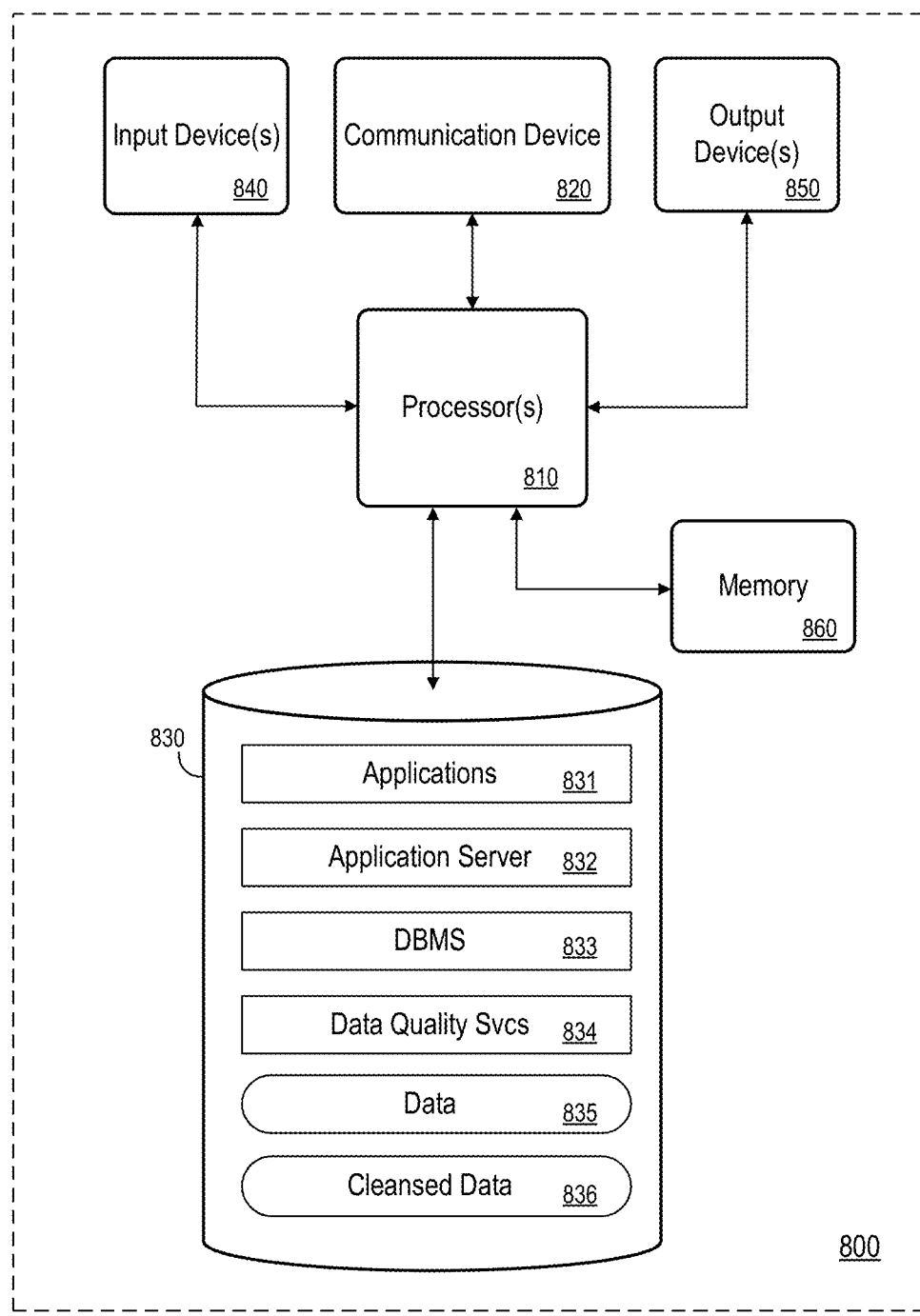
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. According to some embodiments, apparatus 800 may comprise an implementation of database 110 and application server 130 of FIG. 1. Apparatus 800 may include other unshown elements.

Apparatus 800 includes processor 810 operatively coupled to communication device 820, data storage device 830, one or more input devices 840, one or more output devices 850 and memory 860. Communication device 820 may facilitate communication with external devices, such as a client, or an external data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s)

850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Applications 831, application server 832, DBMS 833 and data quality services 834 may comprise program code executed by processor 810 to cause apparatus 800 to perform any one or more of the processes described herein. Embodiments are not limited to execution of these processes by a single apparatus.

Data 835 may comprise database tables storing data for one or more applications 831, warehoused data, and/or any other data desired to be stored. Cleansed data 836 may comprise data from data 835 which has been subjected to tone or more transforms as described above.

Data 835 and cleansed data 836 (either cached or a full database thereof) may be stored in device 830 as shown and/or in volatile memory such as memory 860. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps; and
   a processor to execute the processor-executable process steps to cause the system to:
   receive first address data associated with a first location, the first address data comprising first geo-coordinates;
   determine a first two or more candidate cities based on the first address data;
   identify a first one of the first two or more candidate cities based on the first geo-coordinates;
   generate second address data associated with the first location based on the identified first one of the first two or more candidate cities;
   receive third address data associated with a second location, the third address data comprising second geo-coordinates;
   determine a second two or more candidate cities based on the third address data;
   identify a first one of the second two or more candidate cities based on the second geo-coordinates; and
   generate fourth address data associated with the second location based on the identified first one of the second two or more candidate cities.

2. A system according to claim 1, the processor to further execute the processor-executable process steps to cause the system to:
   determine a first two or more candidate street addresses based on the first address data; and
   identify a first one of the first two or more street addresses based on the first geo-coordinates;
   wherein generation of the second address data comprises generation of the second address data based on the identified first one of the first two or more candidate cities and on the identified first one of the first two or more street addresses.

3. A system according to claim 1, the processor to further execute the processor-executable process steps to cause the system to:
   determine a first two or more candidate street addresses based on the third address data;
   determine that a first one of the first two or more street addresses is unidentifiable based on the second geo-coordinates; and
   flag the third address data for manual remediation.

4. A system according to claim 1, wherein a schema of the second address data is different from a schema of the first address data.

5. A computer-implemented method comprising:
   receiving first address data associated with a first location, the first address data comprising first geo-coordinates;
   determining a first two or more candidate cities based on the first address data;
   identifying a first one of the first two or more candidate cities based on the first geo-coordinates;
   generating second address data associated with the first location based on the identified first one of the first two or more candidate cities;
   receiving third address data associated with a second location, the third address data comprising second geo-coordinates;
   determining a second two or more candidate cities based on the third address data;
   identifying a first one of the second two or more candidate cities based on the second geo-coordinates; and
   generating fourth address data associated with the second location based on the identified first one of the second two or more candidate cities.

6. A method according to claim 5, further comprising:
   determining a first two or more candidate street addresses based on the first address data; and
   identifying a first one of the first two or more street addresses based on the first geo-coordinates;
   wherein generation of the second address data comprises generation of the second address data based on the identified first one of the first two or more candidate cities and on the identified first one of the first two or more street addresses.

7. A method according to claim 5, further comprising:
determining a first two or more candidate street addresses based on the third address data;
determining that a first one of the first two or more street addresses is unidentifiable based on the second geo-coordinates; and
flagging the third address data for manual remediation.

8. A method according to claim 5, wherein a schema of the second address data is different from a schema of the first address data.

9. A non-transitory computer-readable medium storing program code, the program code executable by a computer system to cause the computer system to:
receive first address data associated with a first location, the first address data comprising first geo-coordinates;
determine a first two or more candidate cities based on the first address data;
identify a first one of the first two or more candidate cities based on the first geo-coordinates;
generate second address data associated with the first location based on the identified first one of the first two or more candidate cities;
receive third address data associated with a second location, the third address data comprising second geo-coordinates;
determine a second two or more candidate cities based on the third address data;
identify a first one of the second two or more candidate cities based on the second geo-coordinates; and
generate fourth address data associated with the second location based on the identified first one of the second two or more candidate cities.

10. A medium according to claim 9, the program code executable by a computer system to cause the computer system to:
determining a first two or more candidate street addresses based on the first address data; and
identifying a first one of the first two or more street addresses based on the first geo-coordinates;
wherein generation of the second address data comprises generation of the second address data based on the identified first one of the first two or more candidate cities and on the identified first one of the first two or more street addresses.

11. A medium according to claim 9, the program code executable by a computer system to cause the computer system to:
determine a first two or more candidate street addresses based on the third address data;
determine that a first one of the first two or more street addresses is unidentifiable based on the second geo-coordinates; and
flag the third address data for manual remediation.

12. A medium according to claim 9, wherein a schema of the second address data is different from a schema of the first address data.

* * * * *